United States Patent
Yamagishi et al.

(10) Patent No.: US 6,367,312 B1
(45) Date of Patent: Apr. 9, 2002

(54) APPARATUS FOR INSPECTING CONTAINER FOR LEAKAGE OF LIQUID

(75) Inventors: Tetsuo Yamagishi, Tokyo; Katsutoshi Minai, Akishima; Hiroshi Hashimoto, Ome, all of (JP)

(73) Assignees: Sapporo Breweries Ltd., Tokyo; Suntory Limited, Osaka; Toa Manufacturing Company, Tokyo, all of (JP)

( * ) Notice: Subject to any disclaimer, the term of this patent is extended or adjusted under 35 U.S.C. 154(b) by 0 days.

(21) Appl. No.: 09/380,064
(22) PCT Filed: Dec. 24, 1998
(86) PCT No.: PCT/JP98/05885
§ 371 Date: Aug. 25, 1999
§ 102(e) Date: Aug. 25, 1999
(87) PCT Pub. No.: WO99/34188
PCT Pub. Date: Jul. 8, 1999

(30) Foreign Application Priority Data

Dec. 25, 1997 (JP) .................................. 9-358238
Dec. 25, 1997 (JP) .................................. 9-358239
Dec. 25, 1997 (JP) .................................. 9-358240

(51) Int. Cl.[7] ................................................ G01M 3/04
(52) U.S. Cl. ...................................................... 73/49.2
(58) Field of Search .............................. 73/49.2, 49.3, 73/41, 45, 45.1, 45.2, 45.3, 45.4, 45.5

(56) References Cited

U.S. PATENT DOCUMENTS 4,852,392 A  *  8/1989  Evans ........................ 73/41.2
5,280,832 A  *  1/1994  Lisec ........................ 198/626.5
5,307,685 A  *  5/1994  Bloome et al. ................ 73/756
5,638,659 A  *  6/1997  Moncrief et al. ............. 53/448
5,935,523 A  *  8/1999  McCandless et al. ......... 422/100

FOREIGN PATENT DOCUMENTS

JP   359128426 A  *  7/1984  ................... 73/40
JP   62-73135       *  4/1987  ............ G01M/3/26
JP   3-269232       *  11/1991 ............ G01M/3/16

* cited by examiner

Primary Examiner—Hezron Williams
Assistant Examiner—C D Garber
(74) Attorney, Agent, or Firm—Oblon, Spivak, McClelland, Maier & Neustadt, P.C.

(57) ABSTRACT

A leakage inspecting device for a sealing stopper in a mouth portion of a container, including a positioning member including an inner stand wall, the inner stand wall having a diameter larger than a boundary surface between the mouth portion and a brush attached to the mouth portion and configured to make watertight contact with the mouth portion, a first placing unit configured to place the positioning member on the mouth portion at an inspection spot and align axis centers of the positioning member and mouth portion, a second placing unit configured to place the inner stand wall onto an upper surface of the mouth portion and situate the inner stand wall on the mouth portion, an injection unit configured to inject water into the inner stand wall and mouth portion, and a measuring unit including a probe configured to measure electric conductivity of the water.

6 Claims, 9 Drawing Sheets

APPARATUS FOR INSPECTING CONTAINER FOR LEAKAGE OF LIQUID

FIELD OF THE INVENTION

The present invention relates to a liquid leakage inspecting device which inspects a barrel-like liquid container containing beer, for instance, and detects liquid leakage from the mouth of the container.

BACKGROUND OF THE INVENTION

Conventionally, a container for beer is barrel-shaped and made of an aluminum plate or steel plate. The barrel-shaped container is strong, and has a relatively large capacity. The capacity of such a container is 7 litters, 10 litters, 15 litters, 20 litters, 25 litters, or 50 litters. The container is provided with a sealing stopper unit in its mouth portion to maintain the quality of the content liquid sealed in the container, and to prevent the content liquid from deteriorating and losing flavor.

The sealing stopper unit comprises: a mouth portion $1a$ formed on the upper surface or the lower surface of a container 1 containing liquid such as beer B; a bush a placed in the mouth portion $1a$; a liquid raising cylindrical member c inserted into the bush a by the pushing force of first springs b; a gas valve d provided on the outer periphery of the upper surface of the liquid raising cylindrical member c so as to be engaged with the inner surface of the upper portion of the bush a; and a solution valve f which raises the content liquid by pressure air G supplied into the container 1 through the liquid raising cylindrical member c when the gas valve d is opened by the pushing force of second springs e, and which valve f discharges the content liquid out of the container 1.

In the production line of the beer B, defective products whose content liquid is leaking from the mouth portion $1a$ of the container 1 are detected and then discharged out of the main line of the production line. The container 1 is repeatedly used in view of resource conservation.

In the liquid leakage inspecting device, which judges whether the content liquid is leaking from the mouth portion $1a$ of the container 1, pure water w is injected into a concave portion g formed on the upper surface of the sealing stopper unit 4' in the mouth portion $1a$ of the container 1, and a probe P is then put in the pure water w to measure its electric conductivity, thereby detecting liquid leakage.

In FIGS. 8 and 9, cylinders $S'_1$ are disposed on both sides of a conveyer 2' which transports the container 1 having the sealing stopper unit 4' in the mouth portion $1a$. The rods of the cylinders $S'_1$ are provided with clamp units 12' which can be opened and closed with respect to rotational axes 16'. The clamp units 12' are connected to holding frames 15' provided with rollers 14', and holds the container 1 for liquid leakage inspection by a leakage inspecting unit 20'. In the next step to the clamp units 12' on the conveyer 2', cylinders $S'_2$ provided on both sides of the conveyer 2' are actuated to extend the rods toward the axis center O of the container 1. Stopper units 17' having contact portions are attached to the edges of the respective rods of the cylinders $S'_2$. In the next step to the stopper units 17', a water supply unit 31' which supplies the pure water w into the concave portion g formed in the upper portion of the sealing stopper unit 4' is formed. In the next step to the water supply unit 31', a probe P and a leakage inspecting unit 20' are formed. The double-cylindrical probe P is inserted into the pure water w supplied into the concave portion g to measure the electric conductivity of the water, thereby judging whether the content liquid is leaking from the mouth portion $1a$. The leakage inspecting unit 20' is provided with a water supply unit 31" which rotates in the vertical direction by 90 degrees in the ascending position of the probe P after the measurement, and which water supply unit 31" supplies wash water to wash the probe P. In the next step to the leakage inspecting unit 20', an air supply unit 43' which blows dry air or hot air to the water in the concave portion g is provided. In the next step to the air supply unit 43', a reject conveyer 45' is provided. The reject conveyer 43' transports the container 1 judged to be a defective product having leakage and discharged out of the main line of the production line by actuating a reject cylinder $S'_6$.

Positioning units 21' are formed in the locations of the water supply unit 31', the leakage inspecting unit 20', and the air supply unit 43'. Each of the positioning units 21' stops and positions the container 1 being transported on the conveyer 2'. Cylinders $S'_3$ and $S'_4$ as driving power sources are provided on both sides of the conveyer 2'. The edge of each rod of the cylinders $S'_3$ is provided with a grip unit 50' having an arcuate inner surface $50'a$ corresponding to the outer peripheral surface $1b$ of the container 1. Each rod of the cylinders $S'_4$ extends toward the axis center O of the container 1, and is provided with a contact portion 24' (not shown) which can be in contact with the outer peripheral surface $1b$ of the container 1. The conveyer 2' is a belt conveyer or a roller conveyer, for instance.

In a conventional liquid leakage inspecting unit shown in FIG. 8, pure water is injected into the concave portion g formed in the mouth portion g of the container 1 being transported on the conveyer in the pure water injecting position. When the container 1 being transported on the conveyer reaches the inspecting position, the probe P is inserted into the pure water in the concave portion g to measure the electric conductivity of the water. Here, the pure water injecting position is situated at a distance from the inspecting position. Because of this, the pure water injected into the concave portion g of the container in the pure water injection position is subjected to the vibration from the conveyer or the shock caused by the container 1 brought into contact with the guide members. As a result, the pure water flows out of the concave portion, hindering accurate measure of the electric conductivity.

There is another problem that the electric conductivity can be measured only when the beer B is leaking into the pure water from the gas valve d or the solution valve f of the sealing stopper unit 4', because the probe P is inserted into the pure water w injected only into the concave portion g formed on the upper surface of the sealing stopper unit 4'.

In other words, leakage from the boundary between the mouth portion $1a$ and the bush a cannot be detected.

In the conventional liquid leakage inspecting device shown in FIGS. 8 and 9, the probe P is rotated in the vertical direction by 90 degrees in its ascending position after the leakage detection by the probe P inserted into the pure water w supplied into the concave portion g of the mouth portion $1a$ from the water supply unit 31' of the leakage inspecting unit 20'. The water supply unit 31" then supplies wash water to wash the probe P. After that, the air supply unit 43' provided in the next step to the leakage inspecting unit 20' blows dry air or hot air to dry the washed probe P.

As described above, washing the probe P requires a rotating operation of the probe P. Also, since the air supply position is situated at a distance from the water supply position, the drying of the probe P adds to the number of procedures, resulting in poor efficiency of the liquid leakage inspection on the conveyer 2'.

Furthermore, since the water supply unit 31" supplies water only to the outer surface of the probe P, the inside of the double-cylindrical probe P cannot be sufficiently washed. As a result, dust and impurities remain in the probe P, thereby causing a problem that accurate leakage detection cannot be achieved with the repeatedly used probe P.

In the conventional liquid leakage inspecting device shown in FIG. 8, the container 1 being transported on the conveyer 2' is sandwiched by the rollers 14' in the clamp unit 12' when the cylinders $S'_1$ as the driving power sources on both sides of the conveyer 2' are actuated. In the stopper unit 17', the contact portions 24' at the edges of the extended rods of the cylinders $S'_2$ disposed on both sides of the conveyer 2' are brought into contact with the sides and the front of the outer peripheral surface 1b, thereby stopping the transportation of the container 1. In the locations of the water supply unit 31', the leakage inspecting unit 20', and the air supply unit 43', each of the cylinders $S'_3$ and $S'_4$ disposed on both sides of the conveyer 2' is actuated so that the container 1 is sandwiched by the contact portion 24' and the corresponding grip unit 50' having the arcuate inner surface 50'a.

The barrel-shaped container 1 made of an aluminum plate or a steel plate is forcibly pressed at both sides by the cylinders $S'_1$ to $S'_4$ disposed on both sides of the conveyer 2', every time axis center matching, positioning, or transportation halting is performed on the conveyer 2'. As a result, the outer surface of the container 1 is often damaged or deformed. If repeatedly used over a long period of time, the container 1 is deformed during transportation or storing, resulting in irregularity in shape.

If the container 1 is deformed, the nozzle of the water supply unit 31' is situated outside the concave portion g. In such a case, the pure water necessary for the inspection cannot be pooled sufficiently in the concave portion g. Also, the axis center O' of the probe P does not correspond to the axis center O of the container 1 and is situated outside the concave portion g. As a result, the probe P cannot be inserted properly into the concave portion g, but the probe P might be brought into contact with the inner surface of the concave portion g instead. This causes errors in the leakage inspection, and containers might be wrongly judged to be defective products even when there is no leakage. With the above problems, accurate leakage detection cannot be expected.

If the containers vary in size, it is necessary to change the grip units 50' in accordance with the size of each container.

The present invention provides a liquid leakage inspecting device which eliminates the above problems with the conventional liquid leakage inspecting device, such as the poor accuracy in the detection due to the insufficient amount of pure water, and the inability to detect leakage from the boundary between the mouth portion of the container and the bush. In the liquid leakage inspecting device of the present invention, the pure water injecting position corresponds to the inspecting position on the conveyer, and the pure water necessary for the inspection is supplied in the inspecting position. The pure water is prevented from flowing out during the transportation of the container, so that the electric conductivity can be measured with high accuracy. Accordingly, the liquid leakage inspection can be efficiently conducted. Also, liquid leakage from the boundary between the inner surface of the mouth portion of the container and the outer surface of the bush can be automatically and quickly detected. Moreover, the structure of the device of the present invention is simple, and the number of components is small. Thus, compared with the prior art, the production procedures can be simplified, and the production costs can be reduced.

The present invention also provides a liquid leakage inspecting device which eliminates the problem with the drying and washing of the conventional probe, performs the washing and drying of the probe in a short time with little trouble, and efficiently conducts liquid leakage inspection with high accuracy.

The present invention further provides a liquid leakage inspecting device which eliminates the problems with the prior art, such as the inaccurate inspection due to damage or deformation of the container, and inability to comply with different sizes of the container. In the liquid leakage inspecting device of the present invention, the container being transported on the conveyer can be prevented from being damaged or deformed, so that the container can be repeatedly used over a long period of time. The axis matching of the probe can be easily and accurately in accordance with the shape and size of the container, and the container can be easily and accurately positioned and stopped at a desired inspecting spot. The pure water for the leakage inspection can be sufficiently supplied into the concave portion, and the container can be prevented from being wrongly judged to be a defective product. Thus, the device of the present invention can perform highly accurate liquid leakage inspection.

SUMMARY OF THE INVENTION

To eliminate the above problems, the present invention provides a leakage inspecting device which has a sealing stopper unit comprising: a bush attached to a mouth portion of a container containing liquid such as beer being transported on a conveyer; a liquid raising cylindrical member movably inserted into the bush in the vertical direction; a gas valve which can be opened and closed, is formed on the outer periphery of the upper surface of the liquid raising cylindrical member, and is engageable with the inner surface of the upper portion of the bush; and a solution valve which raises the content liquid through the liquid raising cylindrical member by supplying pressure air into the container when the gas valve is opened, and then discharges the content liquid out of the container, and which device measures the electric conductivity of water by inserting a probe into pure water supplied into a concave portion formed in the upper portion of the sealing stopper unit in the mouth portion of the container, thereby judging whether the content liquid is leaking. The leakage inspecting device comprises: a unit which places a positioning member on the mouth portion of the container being transported on the conveyer at an inspecting spot, with the axis center of the positioning member corresponding to the axis center of the mouth portion of the container; a unit which places an inner stand wall onto the upper surface of the mouth portion and also situates the inner stand wall on the outer periphery of the mouth portion, the inner stand wall being formed inside the positioning unit and having a larger diameter than a boundary surface between the mouth portion of the container and the bush attached to the mouth portion; a unit which inject the pure water into the inner stand wall and the concave portion formed in the mouth portion connected to the inner stand wall; and a unit which measures the electric conductivity of the water by inserting the probe into the pure water injected into the inner stand wall and the concave portion of the mouth portion, thereby judging whether the content liquid is leaking from the container.

In the leakage inspecting device of the present invention, the positioning unit can move up and down, and can cover the mouth portion of the container being transported on the conveyer. Also, an inclined guide portion which can forcibly move the container in the direction of the axis center thereof by touching the mouth portion is formed on the inner surface of the lower portion of the positioning unit.

The container and the probe can be moved up and down relatively with each other by driving power sources, and the probe is inserted into the mouth portion of the container.

The positioning unit is secured below an attachment plate in such a manner that the positioning unit can be placed onto the mouth portion, and the probe having a protruding edge is attached to the attachment plate.

The positioning unit may be disposed separately from an attachment plate in such a manner that the positioning unit can be placed onto the mouth portion, and the probe having a protruding edge is attached to the attachment plate.

The positioning unit is externally shaped like an up-side-down saucer or a bell, and a step portion which can be placed on the upper rim of the mouth portion of the container is formed on the lower surface of the inner stand wall. The step portion intersects the axis center. An inclined guide portion which broadens downward is formed under the step portion. The inclined guide portion matches the axis centers with each other by forcibly moving the mouth portion of the container in a horizontal direction intersecting the axis center when the positioning unit covers the mouth portion.

The leakage inspecting device of the present invention further comprises a water supply unit which supplies wash water to the probe and an air supply unit which blows dry air or hot air to the probe. The water supply unit and the air supply unit are situated in the ascending position of the probe in the inspecting position.

The probe has a water passing hole which communicates with the water supply unit and an air injection hole which communicates with the water supply unit. The water passing hole and the air injection hole are situated on the outer periphery of the probe.

In the leakage inspecting device of the present invention, a movable guide bar which adjusts the transportation width of the conveyer in accordance with the size of the container being transported is attached to one side of the conveyer. The axis center of the probe of the leakage inspecting unit corresponds to the center line extending in the longitudinal direction of the transportation width.

The conveyer is provided with a stopper unit comprising a guide bar movable in a direction intersecting a transportation direction of the container by a driving force of a cylinder as a driving power source on one side of the conveyer, and a rod which can be moved toward the axis center of the container by a driving force of another cylinder, and can be in contact with an outer peripheral surface of the container, and extension lengths of rods of the two cylinders are controlled in accordance with the size of the container being transported, so that the axis center of the probe is matched with the center line of the transportation width of the conveyer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
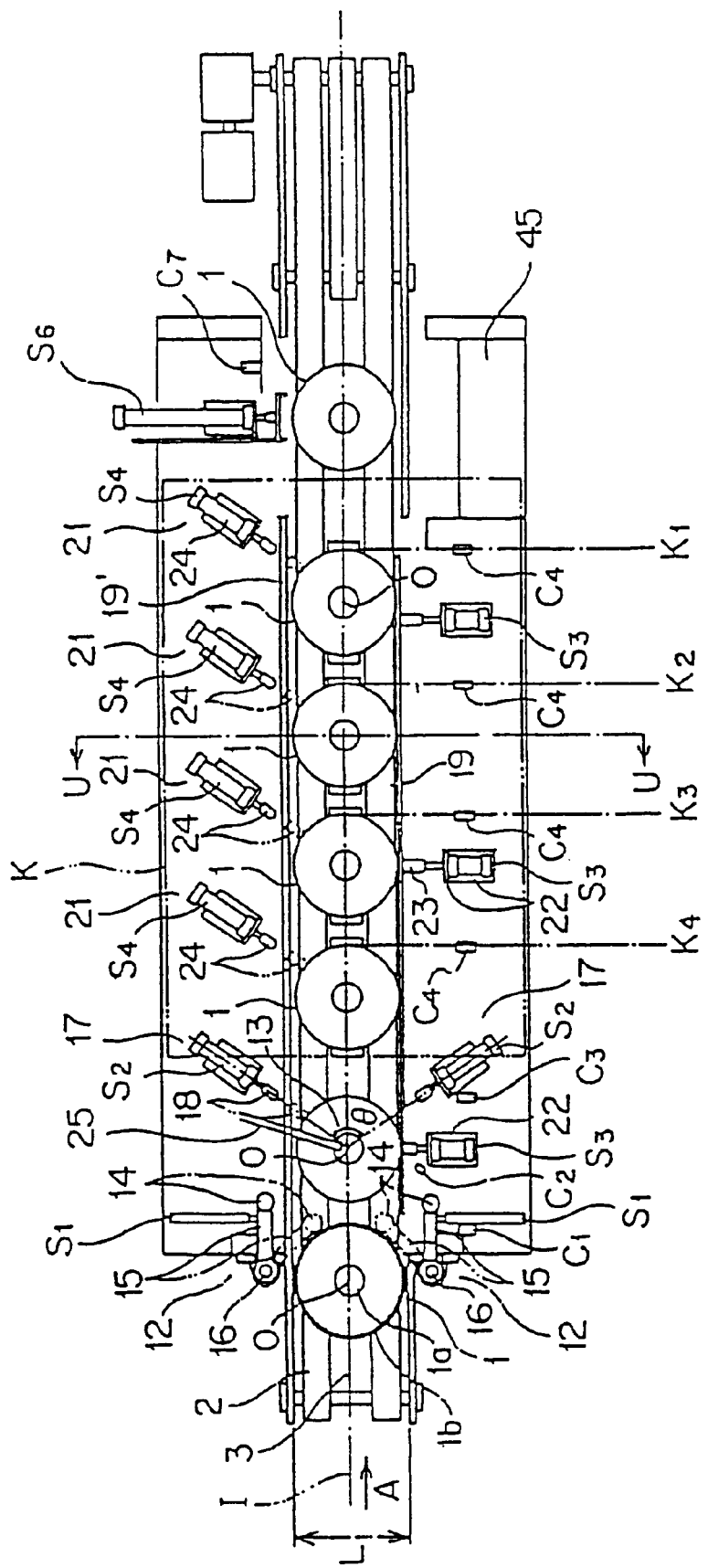
FIG. 1 is a plan view of a first embodiment of a liquid leakage inspecting device of the present invention.

The following is a description of embodiments of the present invention, with reference to the accompanying drawings.

FIGS. 1 to 5 illustrates the first embodiment of the present invention. In these figures, reference numeral 1 indicates a container to be transported on a production line, i.e., a barreling line 3, by a conveyer 2. The container 1 is barrel-shaped and made of an aluminum plate or steel plate. A mouth portion 1a is formed on the upper surface of the container 1. The container 1 can vary in size and capacity, such as 7 litters, 10 litters, 15 litters, 20 litters, 25 litters, or 50 litters.

A sealing stopper unit 4 which is substantially the same as the conventional sealing stopper unit is disposed in the mouth portion 1a of the container 1. A concave portion 5 is formed on the upper portion of the sealing stopper unit 4.

The sealing stopper unit 4 comprises a bush 6, a liquid raising cylindrical member 7, a gas valve 9, and a solution valve 11. The bush 6 is disposed in the mouth portion 1a of the container 1. The liquid raising cylindrical member 7 is inserted into the bush 6 by the pushing force of first springs 8 so that one end 7a of the liquid raising cylindrical member 7 extends deep into the container 1. A gas valve 9 is disposed on the outer periphery of the upper surface of the liquid raising cylindrical member 7, and is rotatably attached to the inner surface of the bush 6. The solution valve 11 is disposed in the upper portion inside the liquid raising cylindrical member 7 by the pushing force of second springs 10. The solution valve 11 can be opened and closed. When the gas valve 9 is opened, a pressure gas G such as carbon dioxide gas or compressed air is supplied into the container 1, and beer B as the content liquid is raised by the welding pressure through the liquid raising cylindrical member 7. The solution valve 11 then discharges the content liquid from the container 1.

In FIG. 1, the conveyer 2 for transporting the container 1 is a roller conveyer or a belt conveyer as in the prior art.

However, the conveyer 2 is provided with clamp units 12 for positioning the axis center O with respect to the center line I in the longitudinal direction of the transportation passage of the conveyer 2. The clamp units 12 hold the container 1 being transported on the conveyer 2 before the container 1 reaches an inspection site K where leakage of the content liquid is detected. In the next step on the conveyer 2, a secondary water filling unit 13 is provided. The secondary water filling unit 13 stops the container 1 being transported on the conveyer 2, and injects pure water w into the concave portion 5 of the mouth portion 1a of the container 1 so as to measure electric conductivity of water.

Although not shown in the figures, it is possible to employ a mouth portion washing unit which washes the mouth portion 1a of the container 1 being transported on the conveyer 2 by supplying pure water to the mouth portion 1a, and a drying unit which removes the pure water from the concave portion 5 of the mouth portion 1a of the container by blowing dry air into the concave portion 5 through an air supply nozzle.

The clamp units 12 rotatably support the base portions of a pair of holding frames 15 having rollers 14 at both sides of the conveyer 2 with rotational axes 16. The rods of cylinders $S_1$ as driving power sources are connected to the holding frames 15. The holding frames 15 are provided with the rollers 14. When a sensor $c_1$ detects the container 1 being transported on the conveyer 2, the cylinders $S_1$ are actuated to rotate the holding frames 15 about the rotational axes 16. The outer peripheral surface 1b of the container 1 is then held by the rollers 14 so that the container 1 being transported on the conveyer 2 can be stopped for a leakage inspection. A sensor $c_2$ determines, before the cylinders $S_1$ are actuated, whether the axis center O of the container 1 sandwiched by the rollers 14 of the clamp units 12 is matched with the center line I.

Stopper units 17 are disposed on both sides of the conveyer 2 and the secondary water filling unit 13 at a predetermined angle $\theta$ with respect to the axis center O of the container 1. The stopper units 17 are formed by contact portions 18 at the edges of the respective rods of cylinders $S_2$ as the driving power sources. The contact portions 18 can be brought into contact with the outer peripheral surface 1b of the container 1. When a sensor $c_3$ detects the container 1 transported to the secondary water filling unit 13, the cylinders $S_2$ are actuated to extend the rods, so that the contact portions 18 are brought into contact with the container 1 to stop the container 1 in a predetermined position on the conveyer 2.

The conveyer 2 of this embodiment is provided with a movable guide bar 19 which can be moved in a direction perpendicular to the transportation direction of the container 1 by the driving force of the cylinder $S_3$ in accordance with the size of the container 1. The guide bar 19 extends along the conveyer 2, and the outer peripheral surface 1b of the container 1 is brought into contact with the guide bar 19. On the opposite side to the guide bar 19, a fixed guide bar 19' is disposed along the conveyer 2.

On the fixed guide bar 19' side of the conveyer 2, stopper units 21 which stop the container 1 on the conveyer 2 in accordance with its size are provided. The number of the stopper units 21 is the same as the number of leakage inspection units 20 formed at inspection points $K_1$, $K_2$, $K_3$, and $K_4$ in the inspection site K.

Figure 4:
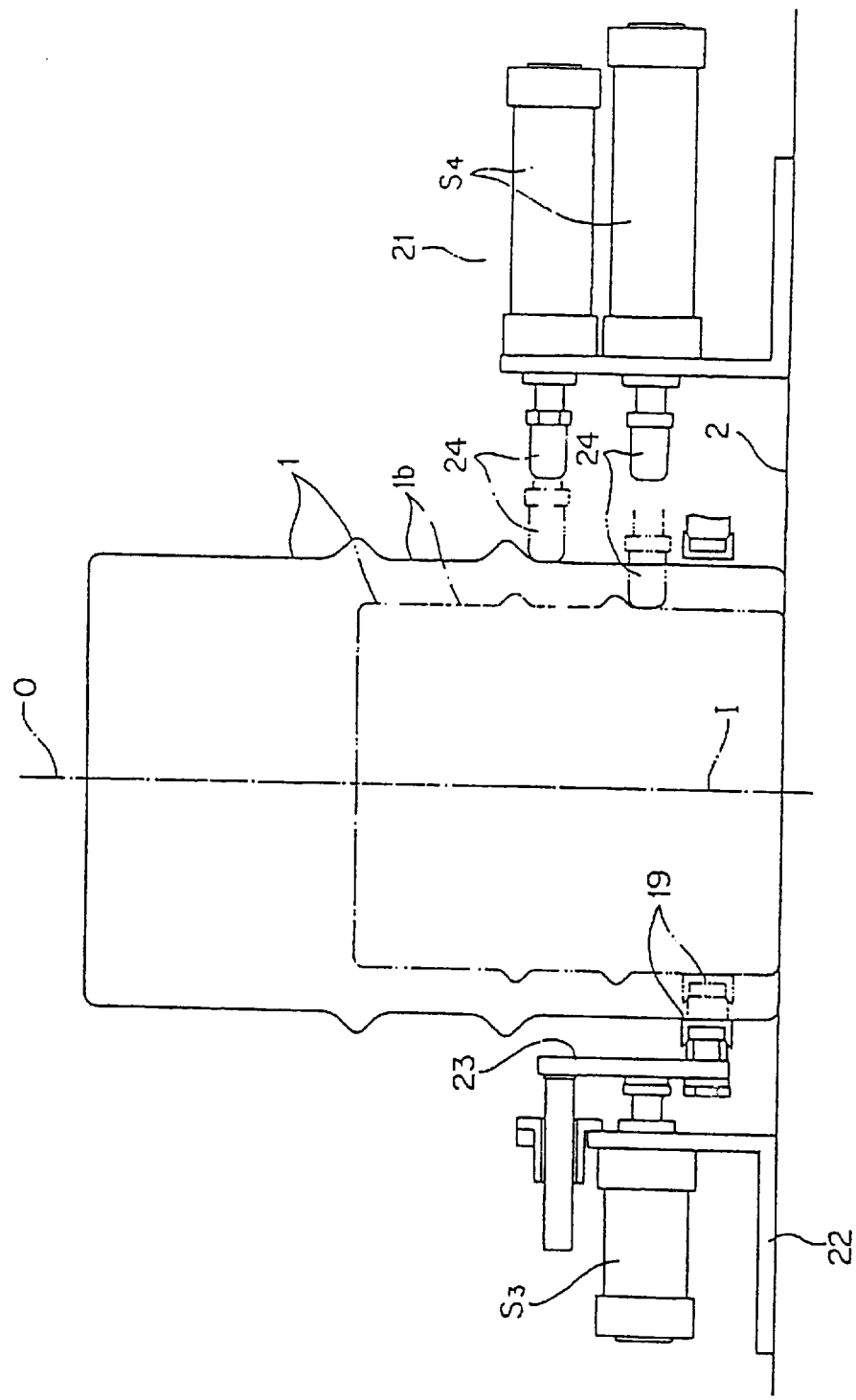
FIG. 4 is an enlarged sectional view of a conveyer of the first embodiment.
Figure 5:
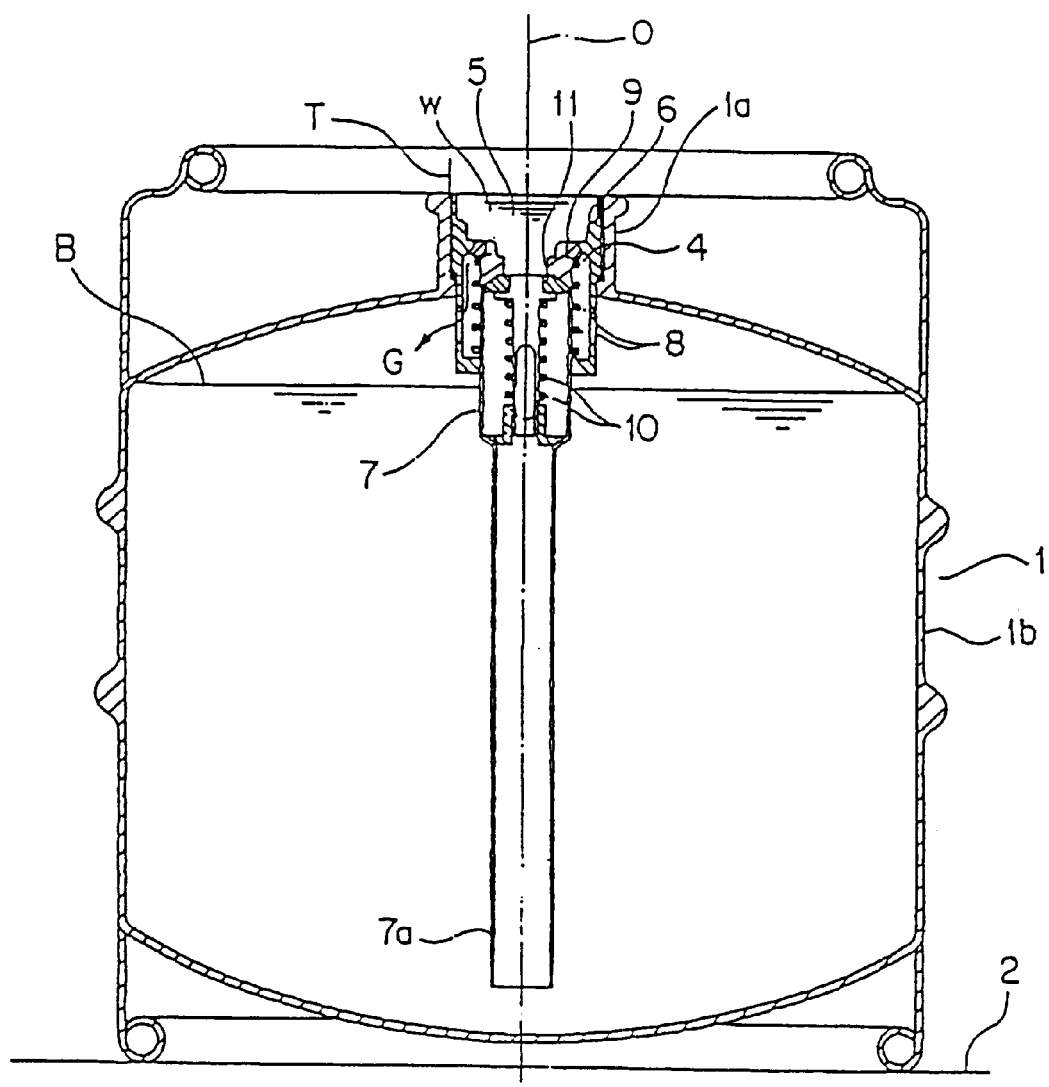
FIG. 5 is an enlarged sectional view of a container having a sealing stopper unit in the mouth portion of the first embodiment.

The movable guide bar 19 is disposed along one side of the conveyer 2, as shown in FIGS. 1 and 4. The movable guide bar 19 is attached to splice plates 23 each formed at the edge of the rod of the corresponding cylinder $S_3$ attached to a sectionally L-shaped stationary plate 22. The cylinder $S_3$ is then actuated, and its rod is extended in accordance with the size of the container 1 being transported by the cylinder $S_3$, so that the transportation width L of the conveyer 2 can be adjusted with the contact portions 24 of cylinders $S_4$. Also, the axis center O' of the probe 27 of each leakage inspecting unit 20 is matched with the center line I of the transportation width L.

Each of the stopper units 21 is made up of a cylinder $S_4$ as a driving power source actuated by a sensor $c_4$ which detects the container 1 transported to the predetermined position, and a contact portion 24 which can be brought into contact with the outer peripheral surface 1b of the container 1. The contact portion 24 is formed at the edge of the rod of the cylinder $S_4$, which is movable toward the axis center O of the container 1 by the driving force of the cylinder $S_4$.

In the secondary water filling unit 13, the pure water w is supplied into the concave portion 5 through a pure water supply nozzle 25 prior to the liquid leakage inspection. The concave portion 5 is formed in the upper portion of the sealing stopper unit 4 in the mouth portion 1a of the container 1 being transported on the conveyer 2.

The leakage inspecting units 20 are arranged in the transportation direction A of the container 1, and the number of the leakage inspecting units 20 is the same as the number of the inspecting spots. In FIG. 4, the four leakage inspecting units 20, for instance, are disposed to the four inspecting spots $K_1$, $K_2$, $K_3$, and $K_4$. Each of the leakage inspecting units 20 is detachably disposed on the upper surface of the mouth portion 1a of the container 1 being transported on the conveyer 2 right under the corresponding leakage inspecting unit 20 in the inspecting site K. Here, the axis center O' of the probe 27 corresponds to the axis center O of the mouth portion 1a of the container 1, and a positioning member 28 which can move up and down is provided so that the probe 27 can be inserted into the mouth portion 1a.

Figure 2:
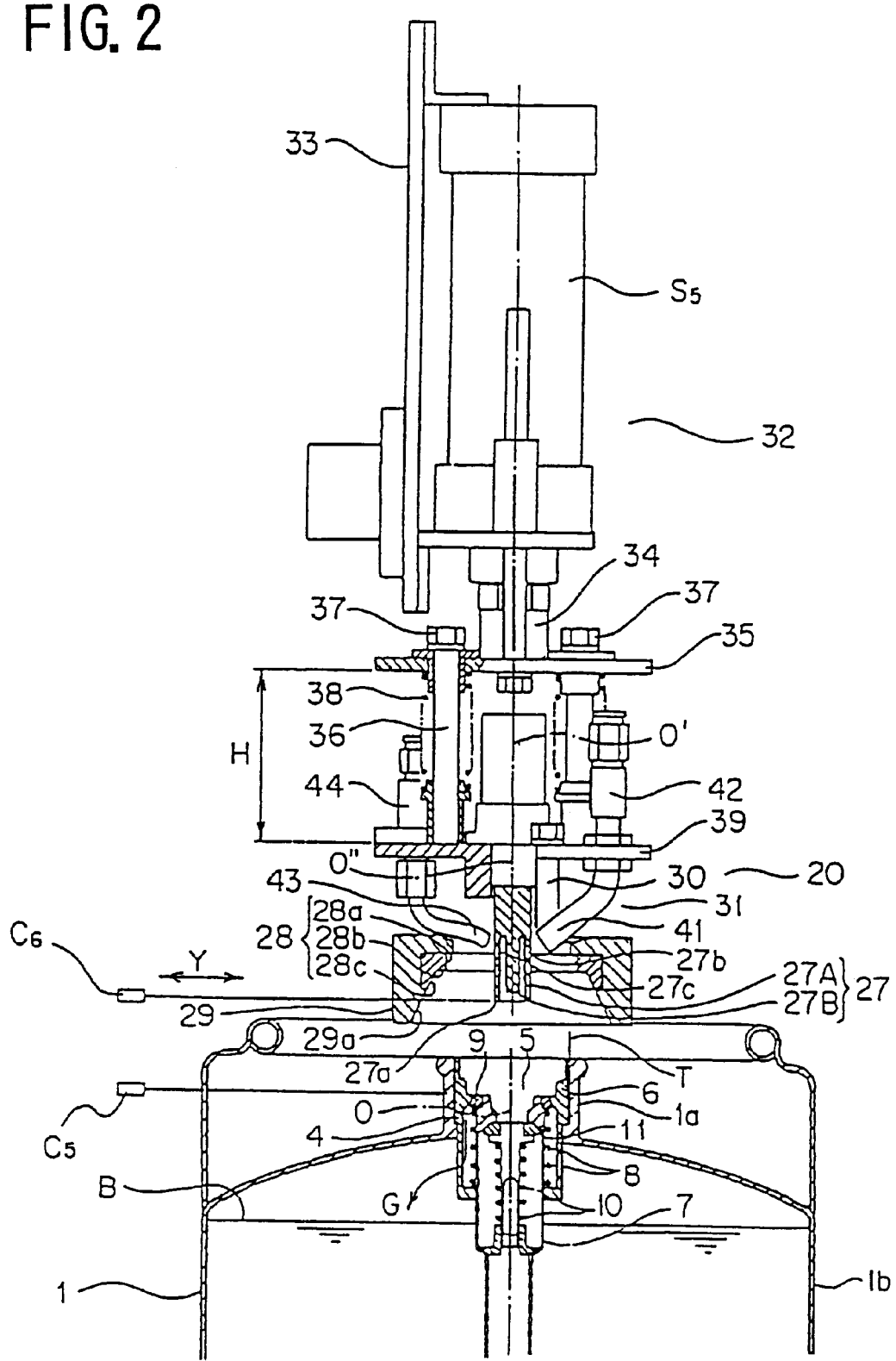
FIG. 2 is an enlarged sectional view taken along the line U—U of FIG. 1.
Figure 3:
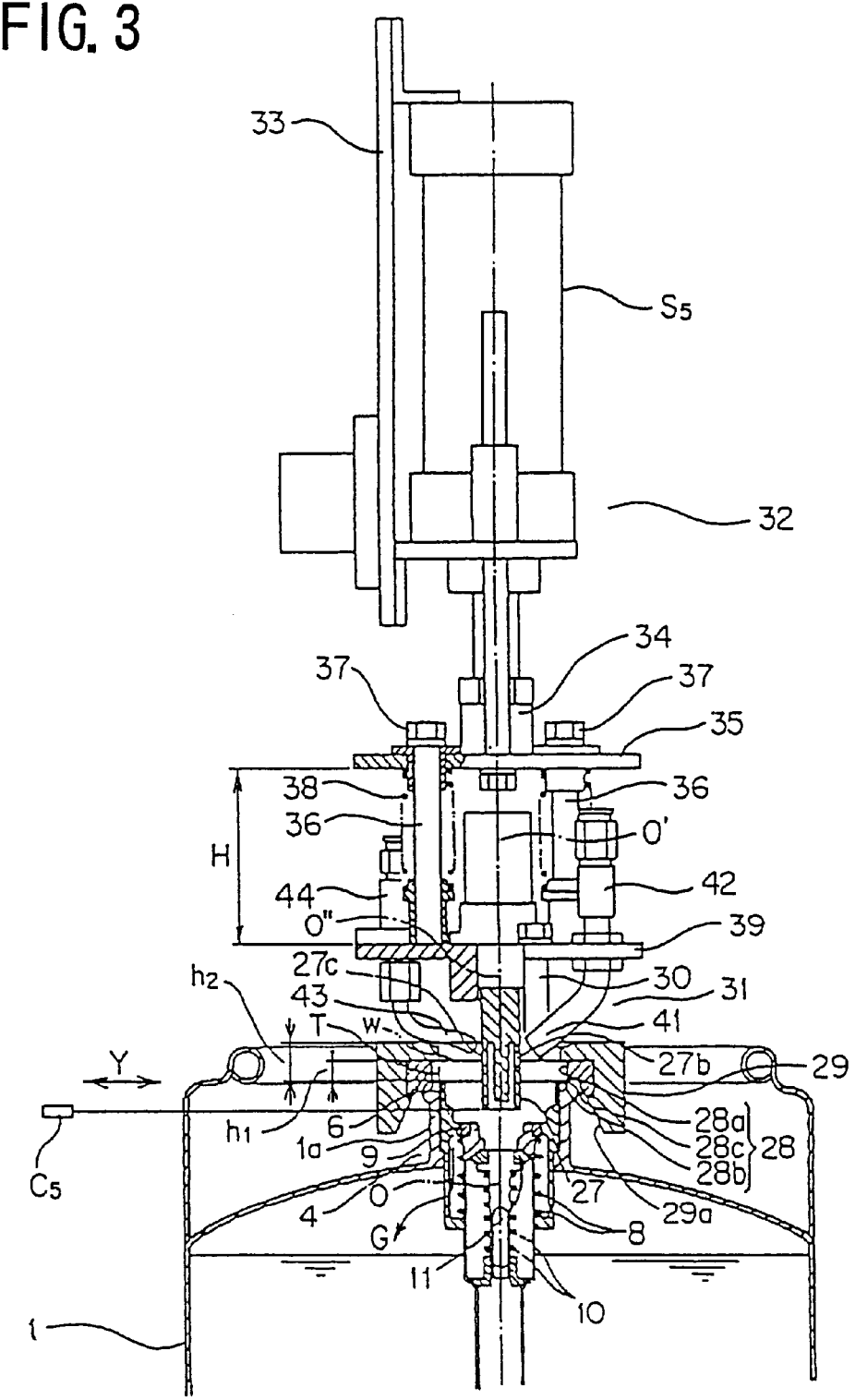
FIG. 3 is an enlarged sectional view illustrating a liquid leakage inspection performed by a leakage inspecting unit of the first embodiment.

The positioning unit 28 is made of plastic, hard rubber, and metal. As shown in FIGS. 2 and 3, the positioning unit 28 externally has the shape of an up-side-down saucer or a bell. The positioning unit 28 includes an inner stand wall 28a, a step portion 28b, and an inclined guide portion 28c. The inside of the positioning unit 28 broadens toward the bottom. The inner stand wall 28a has a larger diameter than the boundary surface T between the inner surface of the mouth portion 1a and the outer peripheral surface of the bush 6 disposed in the mouth portion 1a of the container 1. The step portion 28b is formed on the lower surface of the inner stand wall 28a, and can be placed on the upper surface of the mouth portion 1a of the container 1 in a horizontal direction Y intersecting the axis center O' of the probe 27. The inclined guide portion 28c matches the axis center O' of the probe 27 with the axis center O of the container by forcibly moving the container 1 in the horizontal direction Y intersecting the axis center O when the inclined guide portion 28c covers the mouth portion 1a of the container 1 via the step portion 28b.

In this embodiment, the positioning unit 28 is incorporated into an outer casing 29 having an inclined guide portion 29a extending from the inclined guide portion 28c of the positioning unit 28. The outer casing 29 protects and reinforces the positioning unit 28. The outer casing 29 also facilitates and ensures the matching of the axis center O' of the probe 27 with the axis center O of the container 1 by making the inclined guide portion 28c long enough to keep a large contact portion for the mouth portion 1a of the container.

The positioning unit 28 is fixed to the lower portion of an attachment plate 39 by a plurality of attachment bolts 30. The leading edge 27a of the probe 27 protrudes from the attachment plate 39.

The probe 27 has a water passing hole 27b facing a water supply unit 31 on one side of the outer peripheral surface, and an air injection hole 27c facing an air supply unit on the other side of the outer peripheral surface. The probe 27 is a double cylindrical electrode consisting of an outer cylindrical portion 27A extending from the leading edge to the mid section, and a pillar 27B situated inside the outer cylindrical portion 27A.

The outer peripheral surface of the probe 27 is washed with the pure water w jetted from the water supply unit 31. Furthermore, part of the pure water w is introduced forcibly into the probe 27 through the water passing hole 27b so as to completely wash away dust, impurities, and inspection water remaining in the probe 27, by virtue of the surface tension during an inspection. In other words, every time the probe 27 is inspected for liquid leakage, the inside and outside of the probe 27 are cleaned. Thus, each inspection can be performed with high precision.

A driving unit 32 for moving the probe 27 up and down comprises: a cylinder $S_5$ which serves as a driving power source attached to a frame base 33; a stopper plate 35 secured by the rod 34 of the cylinder $S_5$; an attachment unit made up of a plurality of guide bolts 36 and nuts 37; and the attachment plate 30 elastically held by springs 38 wound around the guide bolts 36 with a distance H being kept from the stopper plate 35. When the cylinder $S_5$ as the driving power source is actuated, the rod 34 is shortened and extended to move up and down the stopper plate 35 attached to the rod 34, the attachment plate 39 held and secured to the stopper plate by the guide bolts 36 and the nuts 37, and the positioning unit 28 attached to the attachment plate 39 by the attachment bolts 30.

A sensor $c_5$ detects the descending position of the probe 27, and actuates the cylinder $S_5$ to raise the rod. The descending position of the sensor $c_5$ depends on the size of the container 1 to be inspected.

A sensor $c_6$ detects the ascending position of the probe 27, and then actuates the cylinder $S_5$ to lower the rod.

A water supply nozzle 41 supplies water into the concave portion 5 of the container 1 and the inner stand wall 28a of the positioning unit 28 disposed on the mouth portion 1a of the container 1. The water supply nozzle 41 is included in the water supply unit 31 for washing the probe 27 after checking whether there is leakage of the content liquid. The water supply nozzle 41 is connected to a water supply pipe 42 penetrating through the attachment plate 39, and the edge of the water supply nozzle 41 faces toward the water passing hole 27b formed in the outer periphery of the mid section of the probe 27. The water supply nozzle 41 jets the pure water w as wash water, so that the inside and outside of the probe 27 are cleaned after each liquid leakage inspection by the probe 27. Thus, the probe 27 can always be prepared for the next inspection.

An air blow nozzle 43 dries the probe 27 washed by the water jetting from the water supply nozzle 41 of the water supply unit 31. The air blow nozzle 43 is connected to an air supply pipe 44 penetrating through the attachment plate 39, and the edge of the air blow nozzle 43 faces toward the air injection hole 27c formed in the outer periphery of the mid section of the probe 27. Every time the probe 27 is washed by the water supplied from the water supply nozzle 41, the air blow nozzle 43 supplies dry air or hot air to dry the inside and outside of the probe 27.

A cylinder $S_6$ is a rejecting cylinder for discharging the container 1 onto a reject conveyer 45 when the leakage detecting units 20 detect leakage from the container 1. The rejecting cylinder $S_6$ is disposed in a direction intersecting the transportation direction A of the conveyer 2, and is actuated when a sensor $c_7$ detects the container 1 being transported.

The first embodiment of the leakage inspecting device of the present invention has the structure as described above. The following is a description of a liquid leakage inspection method and its effects.

First, the beer B as the content liquid is sealed into the container 1 on the production line, or the barreling line 3, and the container 1 is then transported in an erect state on the conveyer 2.

When the censor $c_1$ detects the container 1 being slowly transported on the conveyer 2, the cylinders $S_1$ as the driving power source of the clamp units 12 disposed on both sides of the conveyer 2 are actuated to extend the rod. Here, the holding frames 15 connected to the rod are rotated about the rotational axes 16. The container 1 is held by the rollers 14 attached to the holding frames 15 so as to avoid congestion during the transportation.

The conveyer 2 may be stopped at the same time that the clamp units 12 hold the container 1, but the conveyer 2 may also be kept in operation for higher efficiency of inspection and transportation of the container 1. If a belt conveyer is used as the conveyer 2, the container 1 should be transported slowly enough to restrict the friction between the bottom of the container 1 and the belt conveyer, so that the clamp units 12 can match the axis center O of the container 1 with the center line I of the conveyer 2. Here, the extension of the rods of the cylinders $S_1$ are controlled based on the size of the container 1, so that the axis center O of the container 1 can be matched with the center line I of the conveyer 2. Also, the axis center O' of the probe 27 of the leakage inspecting units 20 used for inspection corresponds to the center line I of the conveyer 2.

If a roller conveyer is used as the conveyer 2, the roller around the rotational axis should rotate by virtue of the rotational force of the rotational axis. When the clamp units 2 hold the container 1, the rotational axis of the roller conveyer of the above type spins without engaging the roller. In such a case, it is not necessary to stop the conveyer 2 to efficiently stop the container 1 on the conveyer 2 or resume the transportation of the container 1.

When the clamp units 12 hold the container 1 and the sensor $c_2$ detects a stop of the transportation of the container 1 on the conveyer 2, the cylinders $S_1$ as the driving power sources are restarted to shorten the rods of the cylinders $S_1$, and the holding frames 15 are rotated with the rollers 14 about the rotational axes 16. Thus, the holding frames 15 are opened, and the container 1 is transported to the next stage by the conveyer 2.

When the sensor $c_3$ detects the container 1 transported to the secondary water filling unit 13 by the conveyer 2, the cylinders $S_2$ as the driving power sources for the stopper units 17 are actuated to extend the rods, and the container 1 being transported on the conveyer 2 is brought into contact with the contact portions 18 formed at the edges of the respective rods, thereby stopping the transportation of the container 1.

When the container 1 is stopped, the pure water supply nozzle 25 supplies the pure water w into the concave portion 5 formed in the upper portion of the sealing stopper unit 4 in the mouth portion 1a of the container 1. Since the extension of the rods of the cylinders $S_2$ is controlled so that the axis center O of the container 1 corresponds to the center line I of the conveyer 2, the concave portion 5 can be surely filled with the pure water w.

The container 1 having the pure water w in the concave portion 5 is then transported to empty leakage inspecting units 20 among the four leakage inspecting units 20 of this embodiment formed on the conveyer 2 adjacent to the secondary water filling unit 13.

When the sensor $c_4$ detects the container 1 transported to one of the leakage inspecting units 20 at the inspection points $K_1$, $K_2$, $K_3$, and $K_4$, the cylinder $S_4$ of the stopper unit 21 disposed on one side of the conveyer 2 is actuated to extend its rod toward the axis center O of the container 1. Here, the contact portion 24 formed at the edge of the rod is brought into contact with one side of the outer peripheral surface 1b of the container 1, and the guide bar 19 disposed on the other side of the conveyer 2 is brought into contact with the other side of the outer peripheral surface 1b of the container 1. Thus, the contact portion 24 and the guide bar 19 softly hold the container 1 at one of the inspection points $K_1$, $K_2$, $K_3$, and $K_4$.

Since the guide bar 19 is attached to the splice plates 23 provided to the edges of the respective rods of the cylinders $S_3$ attached to the sectionally L-shaped fixed plates 22, the cylinders $S_3$ are actuated to extend the rods in accordance with the size of the container 1, thereby adjusting the transportation width L of the conveyer 2. Also, the container 1 is free of unnecessary pressure, because the container 1 is stopped on the conveyer 2, with one side of the outer peripheral surface 1b being in contact with the guide bar 19, and the other side of the outer peripheral surface 1b being in contact with the contact portion 24 on the extended rod of the stopper unit 21. Here, the outer peripheral surface 1b of the container 1 can be prevented from being deformed or damaged, so that the container 1 can be repeatedly used. Also, the container 1 is stopped at a point where the axis center O of the container 1 is matched with the center line I. Thus, the positioning and transportation of the container 1 can be surely carried out.

When the sensor $c_4$ detects the container 1 being transported directly under one of the leakage inspecting units 20 at the inspection points $K_1$, $K_2$, $K_3$, and $K_4$, the cylinder $S_5$ as the driving power source is actuated to extend the rod, so that the probe 27 descends toward the container 1, together with the stopper plate 35 provided to the edge of the rod, and the attachment plate 39 attached to the stopper plate 35 by the guide bolts 36.

Since the positioning unit 28 having the inclined guide portion 28c is attached to the lower portion of the attachment plate 29 by the attachment bolts 30, the inclined guide portion 28c of the positioning unit 28 is brought into contact with the mouth portion 1a of the container 1 when the cylinder $S_5$ is actuated to extend the rod. Accordingly, as the positioning unit 28 is moved downward, the container 1 is forcibly moved along the conveyer 2 in the horizontal direction Y. After the axis center O of the container 1 is forcibly matched with the axis center O" of the positioning unit 28, the step portion 28b of the positioning unit 28 is placed on the upper surface of the container 1, thereby covering the mouth portion 1a of the container 1 with the positioning unit 28. The probe 27 is inserted into the inner stand wall 28a formed in the positioning unit 28, with the axis center O' of the probe 27 being matched with the axis center O" of the positioning unit 28. Because of this, the container 1 can be prevented from being wrongly judged to be a defective product due to the contact between the mouth portion 1a of the container 1 and the probe 27. Thus, each inspection can be performed with high precision. Also, the descending position of the probe 27 is detected by the sensor $c_5$ in accordance with the size of the container 1.

The positioning unit 28 is incorporated into the outer casing 29 having the inclined guide portion 29a extending from the inclined guide portion 28c, thereby making the inclined guide portions 28c and 29a as a contact portion long enough for the mouth portion 1a of the container 1. Accordingly, the axis center O' of the probe 27 can be quickly and accurately matched with the axis center O of the container 1. The outer casing 29 also protects and reinforces the positioning unit 28.

When the sensor $c_5$ detects the descending position, the water supply nozzle 41 supplies pure water w into the inner stand wall 28a of the positioning unit 28, so that the total amount of pure water w reaches the height $h_1$ of the step portion 28b of the positioning unit 28 placed on the upper surface of the mouth portion 1a, as shown in FIG. 3. There is only a short distance between the secondary water filling unit 13 and the leakage inspecting unit 20 at one of the inspecting spots $K_1$, $K_2$, $K_3$, and $K_4$, and the pure water supply position corresponds to the leakage inspecting position. Thus, the pure water w can be prevented from flowing from the concave portion 5 while the container 1 is being transported on the conveyer 2.

The inner stand wall 28a formed in the positioning unit 28 has a larger diameter than the boundary surface T between the inner surface of the mouth portion 1a of the container 1 and the outer surface of the bush 6 attached to the mouth portion 1a, and is situated outside the boundary surface T. Thus, the amount of the additional pure water w supplied from the water supply nozzle 41 corresponds to the height $h_1$ of the positional unit 28 placed on the mouth portion 1a. (In FIG. 3, however, since the positioning unit 28 is incorporated into the outer casing 29, the amount of pure water w seems to correspond to the height $h_2$ of the outer casing 29 mounted on the mouth portion 1a.)

In the above manner, the probe 27 is inserted into the pure water w supplied into the concave portion 5 of the mouth portion 1a of the container and the inner stand wall 28a of the positioning unit 28 connected to the concave portion 5, with the axis centers O and O' corresponding to each other. Even if the probe 27 is brought into contact with the inner wall of the concave portion 5, the container 1 can be prevented form being wrongly judged to be a defective product. The electric conductivity of the inspection water (pure water w) is measured so as to judge whether the beer B as the content liquid is leaking from the mouth portion 1a of the container 1.

The pure water w is supplied into the inner stand wall 28a situated outside the upper surface of the boundary surface T between the inner surface of the mouth portion 1a of the container and the outer surface of the bush 6 attached to the mouth portion 1a. Accordingly, liquid leakage between the inner surface of the mouth portion 1a and the outer surface of the bush 6 can be detected through the inspection, as well as liquid leakage between the gas valve 9 and its valve seat in the sealing stopper unit 4, and between the solution valve 11 and its valve seat.

After the electric conductivity of the water is measure, the cylinder $S_5$ is actuated to shorten the rod 34. The stopper plate 35 mounted on the rod 34 and the probe 27 attached to the attachment plate 39 attached to the stopper plate 35 by the guide bolts 36 via the distance H then ascend to the original position. When the sensor $c_6$ detects the probe 27 back in its original position, the water supply nozzle 41 of the water supply unit 31 jets the pure water to wash the probe 27. Here, the pure water w supplied from the water supply nozzle 41 surely washes not only the outer cylindrical portion 27A of the probe 27, but also the inner surface of the outer cylindrical portion 27A and the pillar 27B through the water passing hole 27b formed in the outer cylindrical portion 27A of the probe 27.

The air blow nozzle 43 of the air supply unit blows hot air or dry air to dry the washed probe 27, thereby preparing the probe 27 for the next liquid leakage inspection.

The cylinder $S_4$ of the stopper unit 21 is then actuated to shorten the rod, and the transportation passage A of the conveyer 2 is opened to transport the inspected container 1. If the container 1 is judged to be a defective product, the reject cylinder $S_6$ is actuated so that the rod is extended to discharge the defective container 1 to the reject conveyer 45.

Figure 6:
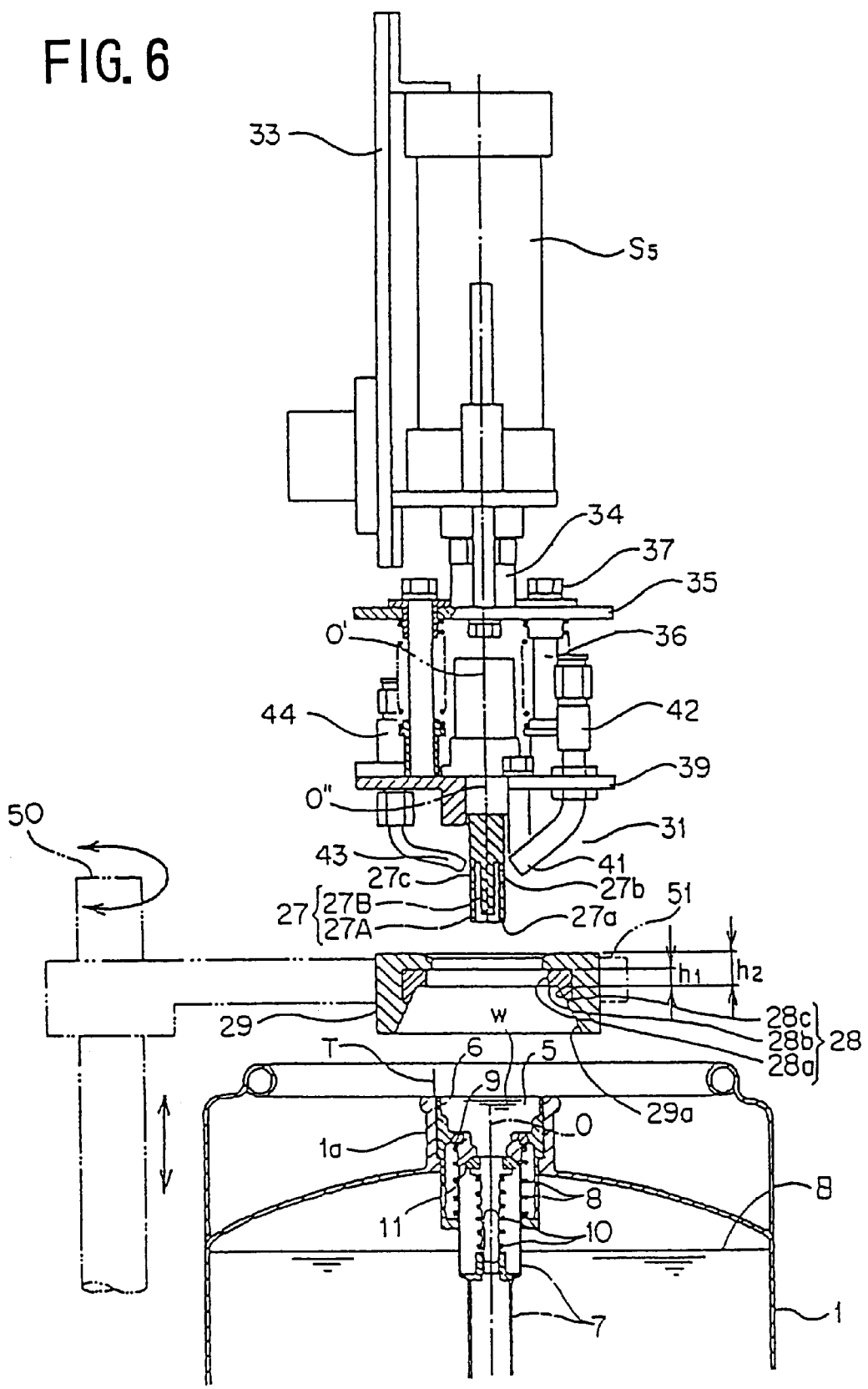
FIG. 6 is an enlarged sectional view of a second embodiment of the present invention.
Figure 7:
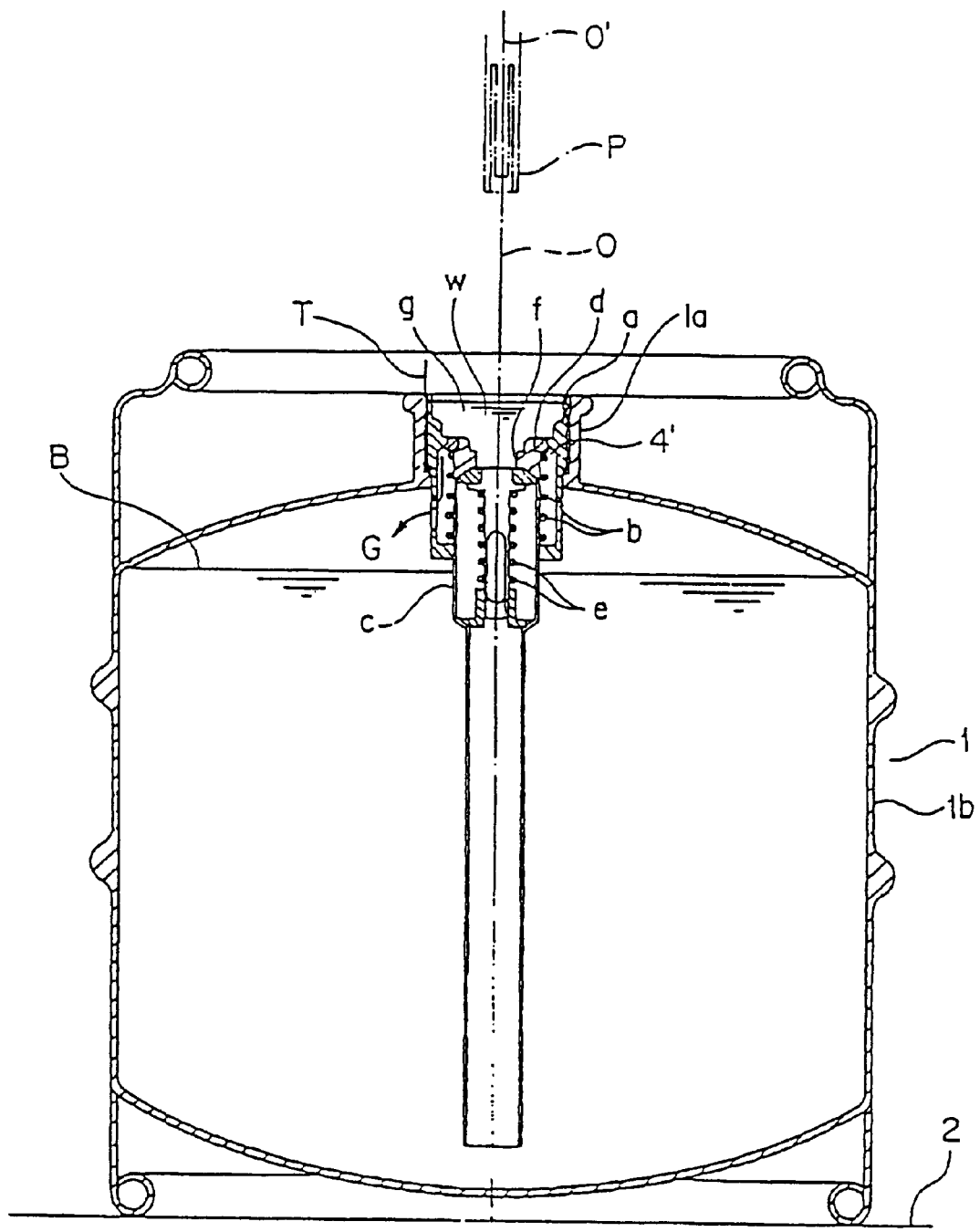
FIG. 7 is an enlarged sectional view of a conventional beer container having a sealing stopper unit in the mouth portion.
Figure 8:
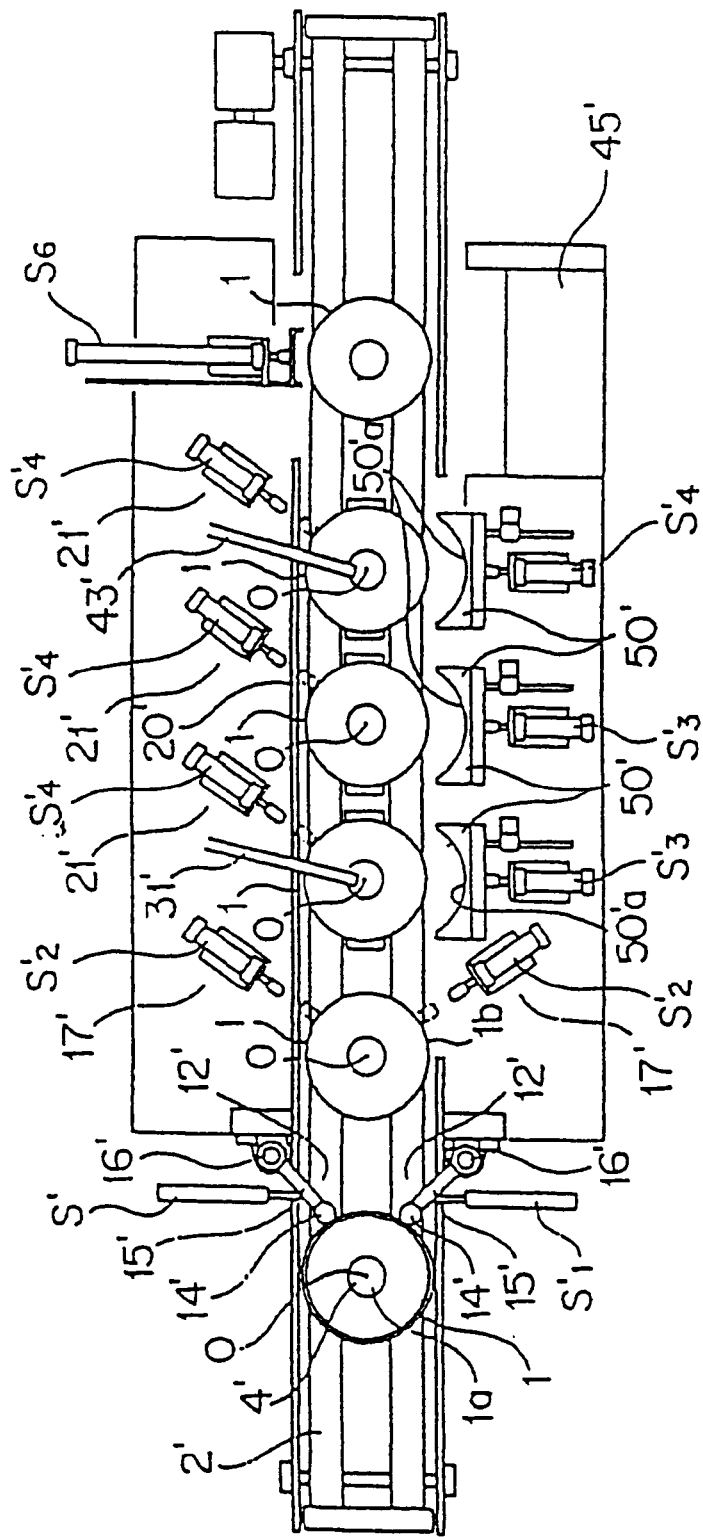
FIG. 8 is a plan view of one example of a conventional liquid leakage inspecting device.
Figure 9:
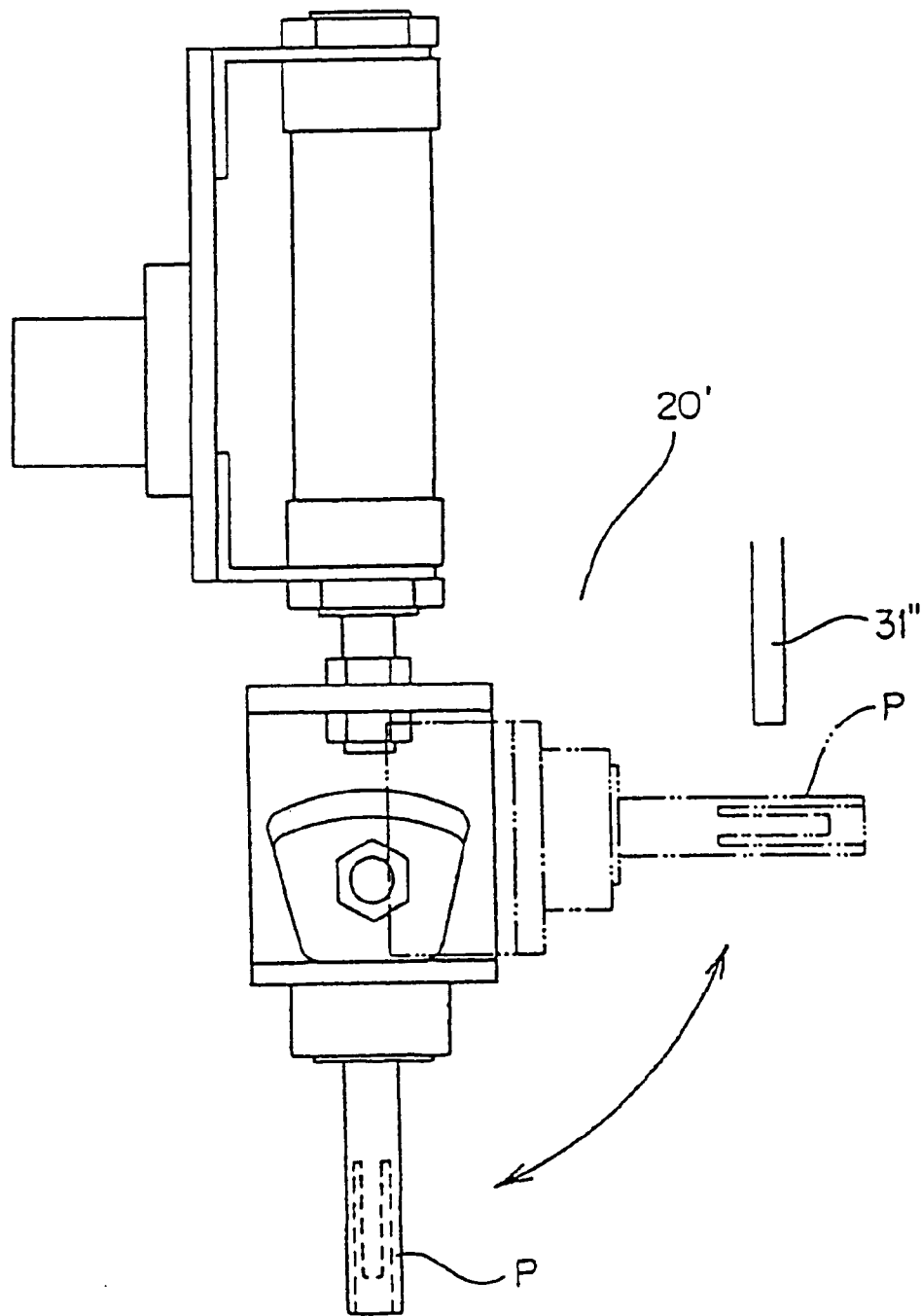
FIG. 9 is an enlarged front view of a probe and a feed unit in the leakage inspecting unit of the conventional liquid leakage inspecting device.

FIG. 6 illustrates another embodiment of the present invention.

In the first embodiment, the positioning unit 28 is attached to the attachment plate 39, which is moved up and down by the rod 34 of the cylinder $S_6$ of the leakage inspecting unit 20. When the container 1 is inspected, the positioning unit 28 is placed on the mouth portion 1a to supply the pure water w.

In the second embodiment, however, the positioning unit 28 is formed separately from the attachment plate 39, to which the probe 27 is attached.

More specifically, when the positioning unit 28 is placed on the mouth portion 1a of the container 1, a supporting unit 51 rotatable about a rotational axis 40 in the horizontal direction above the conveyer 2 moves the positioning unit 28 in the parallel direction with the mouth portion 1a of the container 1. The positioning unit 28 is then moved up and down, and is placed on the mouth portion 1a, so that the axis center O" of the positioning unit 28 corresponds to the axis center O of the mouth portion 1a of the container 1. The water supply nozzle 41 then supplies the pure water w into the positioning unit 28 to judge whether the content liquid is leaking. After the inspection, the positioning unit 28 is removed from the container 1.

In the above embodiments, the probe 27 moves up and down with respect to the mouth portion 1a of the container 1 being transported on the conveyer 2 by the driving force of the cylinder $S_5$, and the probe 27 performs a leakage inspection to judge whether the content liquid is leaking from the mouth portion 1a. However, the container 1 may be moved up and down with respect to a fixed probe 27 to perform a leakage inspection.

Effects of the Invention

As described so far, in the present invention, the pure water injection position on the conveyer corresponds to the liquid leakage inspection position. In the inspection position, the pure water is injected into the concave portion formed in the mouth portion of the container and the positioning unit placed on the mouth portion, so that the pure water used in the inspection can be prevented from flowing out of the container during the transportation. The electric conductivity of the water can be measured with high accuracy, and defective products can be precisely detected. Thus, highly efficient inspection can be carried out.

In the prior art, liquid leakage cannot be detected from the boundary surface between the inner surface of the mouth portion and the outer surface of the bush. In the present invention, however, the positioning unit having an inner stand wall having a larger diameter than the boundary surface is placed on the mouth portion of the container, thereby enabling quick and accurate leakage detection from the boundary surface.

In the liquid leakage inspecting device of the present invention, the positioning unit is placed on the upper surface of the mouth portion of the container provided with the sealing stopper unit, and the probe is then inserted to measure the electric conductivity of the water to check for liquid leakage. The liquid leakage inspecting device of this structure is simple and does not require a large number of components. Accordingly, the production procedures can be simplified, and the production costs can be reduced.

Also, the movable guide bar is disposed on one side of the conveyer, so that the transportation width of the conveyer can be adjusted in accordance with the size of the container. Here, the axis center of the probe of the leakage inspecting unit is substantially matched with the center line situated in the longitudinal direction of the transportation width of the conveyer. Because of this, no strong force is required for holding the container being transported on the conveyer. Thus, the container can be prevented from being deformed or damaged. Also, the axis center matching, positioning, stopping, and transporting are all readily and surely performed. Thus, the container can be repeatedly used over a long period of time.

The inspection water for the liquid leakage inspection is supplied into the concave portion formed in the mouth portion of the container, with the water supply unit being situated exactly in the location of the concave portion. In this manner, the concave portion can be sufficiently filled with the inspection water, and the probe can be prevented from being situated outside the concave portion and from touching the inner surface of the concave portion. Thus, the liquid leakage inspection can be performed with high precision, without wrong judgements.

The movable guide bar formed on one side of the conveyer simplifies the structure of the liquid leakage inspecting device of the present invention. Thus, the production procedures can be simplified accordingly, and the production costs can be reduced. Also, it is easy to adjust the transportation width of the conveyer in accordance with the size of the container.

As described so far, the liquid leakage device of the present invention is provided with the water supply unit for supplying wash water into the upper position of the probe in the inspecting position, and the air supply unit for blowing dry air or hot air. Thus, the washing and drying of the probe for accurate inspection can be quickly carried out with little trouble. Also, the production procedures can be simplified, and the production and equipment costs can be reduced.

What is claimed is:

1. A leakage inspecting device for a sealing stopper unit in a mouth portion of a container on a conveyer, comprising:

a positioning member including an inner stand wall formed therein, the inner stand wall having a diameter larger than a boundary surface between the mouth portion of the container and a bush attached to the mouth portion and configured to make a watertight contact with the mouth portion of the container;

a first placing unit configured to place the positioning member on the mouth portion of the container being transported on the conveyer at an inspection spot and align an axis center of the positioning member to an axis center of the mouth portion of the container;

a second placing unit configured to place the inner stand wall of the positioning member onto an upper surface of the mouth portion and situate the inner stand wall on an outer periphery of the mouth portion;

an injection unit configured to inject water into the inner stand wall and a concave portion formed in the mouth portion connected to the inner stand wall;

a measuring unit including a probe configured to measure electric conductivity of the water, the measuring unit being configured to insert the probe into the water injected into the inner stand wall and the concave portion of the mouth portion and judge whether liquid content is leaking from the container;

a water supply unit configured to supply wash water to the probe; and an air supply unit configured to blow one of dry air and hot air to the probe;

wherein the water supply unit and the air supply unit are positioned in an ascending portion of the probe at the inspection spot.

2. The leakage inspection device as claimed in claim 1, wherein:

the container and the probe are moved up and down relatively with each other by a driving power source; and the probe is inserted into the mouth portion of the container.

3. The leakage inspection device as claimed in claim 1, wherein:

the probe has a water passing hole which communicates with the water supply unit and an air injection hole which communicates with the air supply unit; and the water passing hole and air injection hole are positioned on an outer periphery of the probe.

4. A leakage inspecting device for a sealing stopper unit in a mouth portion of a container on a conveyer, comprising:

a positioning member including an inner stand wall formed therein, the inner stand wall having a diameter larger than a boundary surface between the mouth portion of the container and a bush attached to the mouth portion and configured to make a watertight contact with the mouth portion of the container;

first placing means for placing the positioning member on the mouth portion of the container being transported on the conveyer at an inspection spot and align an axis center of the positioning member to an axis center of the mouth portion of the container;

second placing means for placing the inner stand wall of the positioning member onto an upper surface of the mouth portion and situate the inner stand wall on an outer periphery of the mouth portion;

injection means for injecting water into the inner stand wall and a concave portion formed in the mouth portion connected to the inner stand wall;

measuring means for measuring electric conductivity of the water and judging whether liquid content is leaking from the container;

water supply means for supplying wash water to the measuring means; and air supply means for blowing one of dry air and hot air to the measuring means;

wherein the water supply means and the air supply means are positioned in an ascending portion of the measuring means at the inspection spot.

5. The leakage inspection device as claimed in claim 4, wherein:

the container and the measuring means are moved up and down relatively with each other by a driving power source; and the measuring means takes a measurement in the mouth portion of the container.

6. The leakage inspection device as claimed in claim 4, wherein:

the measuring means has a water passing hole which communicates with the water supply means and an air injection hole which communicates with the air supply means; and the water passing hole and air injection hole are positioned on an outer periphery of the measuring means.

\* \* \* \* \*